J. W. FAY.
CHILL.
APPLICATION FILED AUG. 27, 1921.

1,435,919.

Patented Nov. 21, 1922.

INVENTOR:
Joseph W. Fay
By E. J. Andrews
Atty.

Patented Nov. 21, 1922.

1,435,919

UNITED STATES PATENT OFFICE.

JOSEPH W. FAY, OF MILWAUKEE, WISCONSIN, ASSIGNOR TO FRED PABST COMPANY, OF MILWAUKEE, WISCONSIN, A CORPORATION OF WISCONSIN.

CHILL.

Original application filed April 19, 1920, Serial No. 374,817. Divided and this application filed August 27, 1921. Serial No. 496,014.

*To all whom it may concern:*

Be it known that I, JOSEPH W. FAY, a citizen of the United States, residing at Milwaukee, in the county of Milwaukee and State of Wisconsin, have invented certain new and useful Improvements in Chills, of which the following is a specification.

This invention relates to chills used for the purpose of cooling or solidifying molten metal while soldering, brazing, welding, or the like. The invention is particularly applicable to spot or seam welding. Herein I have shown it applied to an electric seam welding machine. This application is a division of my application for a patent on improvements in electric welding machines, filed April 19, 1920, Serial No. 374,817, and reference may be had to that application for further information in reference to the particular machine. However, it is to be understood that the chill described is applicable to many other types of welding machines and for purposes other than welding. One of the objects of the invention is to provide a suitable chill for preventing molten metal from running through the slot of the sheet or tube, or other article, which is being welded, the chill hardening and setting the molten metal as it passes through the slot which is being welded. Another object is to provide a suitable support for the chill.

Figure 1:
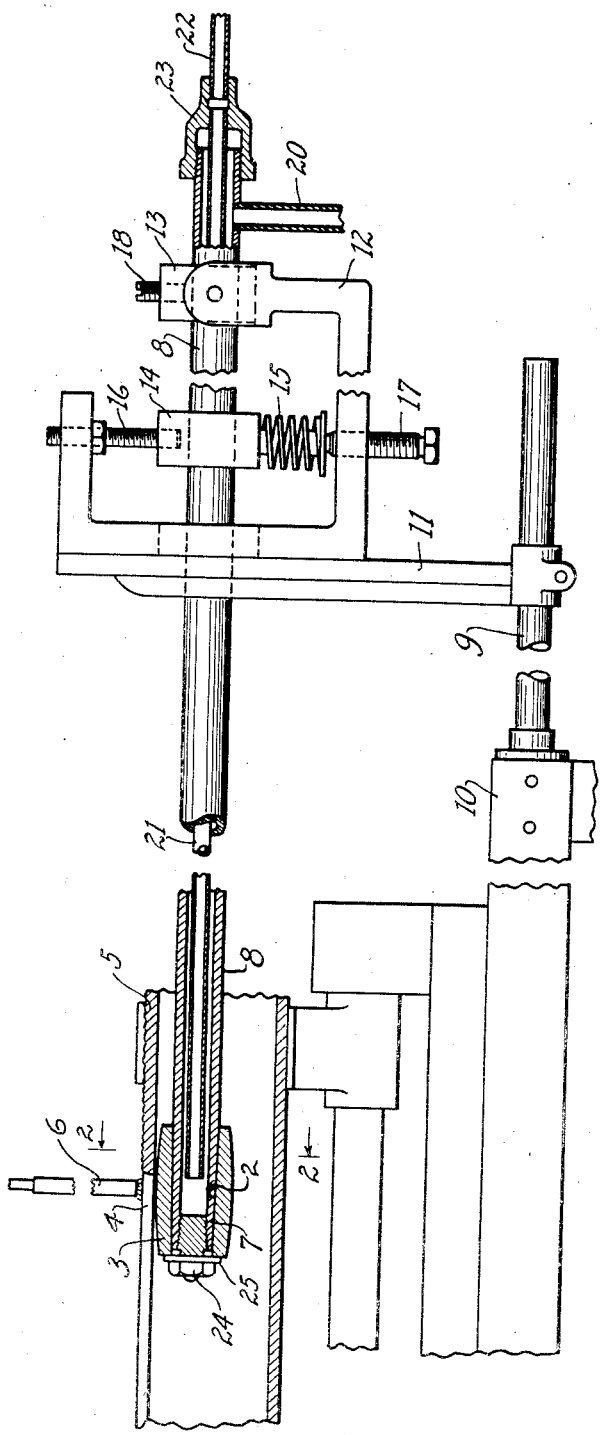
Figure 2:
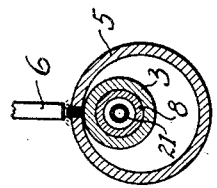

Of the accompanying drawings Fig. 1 is an elevation of a chill and supporting mechanism therefor which embodies the features of my invention; and Fig. 2 is a section along the line 2—2 of Fig. 1.

The chill comprises a head or mandrel 3 composed of any suitable metal. I prefer copper for the purpose. The head is adapted to be supported immediately beneath the seam which is being welded and to cool and set the molten metal which is passed into the seam. In this instance the molten metal is passed into the slot 4 of the tube 5 which is being welded by means of a metal electrode 6, in any ordinary or suitable manner. Means are provided for keeping the head 3 at the proper temperature and for regulating the position of the same with reference to the weld; it being understood that the electrode and the head are normally stationary, and the tube is moved longitudinally as it is being welded. However, it is obvious that the tube itself might be stationary and the electrode and the chill moved relatively thereto.

The head has a bore 2 which I prefer to have more or less conical, and which snugly fits the conical end 7 of the tube 8, the tube being of sufficient length to allow the head to pass along the entire seam that is welding. The other end of the tube 8 is supported in any suitable manner. I prefer to support it by means of a rod 9 fixed to the end of the frame 10 of the welding machine. Adjustably mounted upon the rod 9 is a bracket 11. Pivoted to the arm 12 of the bracket is a block 13. Through an opening in the block 13 the tube 8 passes. The tube also passes through an opening in a block 14, which is supported by means of an adjustable spring 15. Any undue upward movement of the tube 8 is prevented by means of a screw 16. The spring 15 thus supports the chill head end of the tube 8 and yieldingly holds the head against the seam which is welding and thus sets the welding metal substantially flush with the inner surface of the tube 8. The compression of the spring is adjusted by means of a screw 17. By these means the chill is not only supported but may be very sensitively adjusted in position. At the same time it is yieldingly supported so that in case of necessity it will give sufficiently without straining any of the parts. It is firmly held in longitudinal position by means of a screw 18 in the block 13.

The temperature of the chill head may be kept suitably low by the use of any cooling fluid, such as air or water. The fluid is passed from any suitable source, into the tube 8, by means of an inlet 20. It then passes in the tube 8 to the chill head end thereof, and then passes outwardly through the tube 21 and an outlet 22. It is to be understood, however, that the passage of the fluid may be reversed if desired. A compound coupling 23 holds, in suitable relative positions, the ends of the tubes 8, 21, and 22.

In use it is desirable to have the head 3 easily removable from the tube 8 for repairs, or otherwise; and it is also desirable to have it easily rotatable on the tube, so that when one portion becomes worn or pitted, or burned, another portion may be turned to face the weld. For these purposes I provide the conical end 7 on the tube 8, and the corresponding conical bore 2 in the hand 3. A bolt 24, screwed into the bore of the tube 8, with a collar 25, are used for holding the head firmly on the tube, and for closing the end of the tube opening.

By these means I provide a chill head which is not in direct contact with the cooling fluid, and hence there will be no leakage of the fluid in case of a puncture of the head; and if any portion of the surface of the head becomes pitted, or injured so as to not properly fulfill its function, the head may be rotated on the tube, so as to bring a new portion of the surface of the head into operative position; and the head may be very conveniently removed and replaced or repaired. Evidently the temperature of the head may be regulated to suit the needs of that particular work by regulating the rate of flow of the fluid, or the temperature of the inflowing fluid; or by varying the fluid itself by using a gas or liquid and the particular gas or liquid that produces the best result.

I claim as my invention:

1. A chill comprising a tube, a chill head rotatably mounted on one end of said tube, and means for cooling said head.

2. A chill comprising a tube, a chill head having a bore into which one end of said tube passes, and means threaded into said tube end rotatably holding said head on said tube.

3. A chill comprising a tube having a conical end, and a chill head having a conical bore, said conical end fitting snugly but rotatably into said bore.

4. A chill comprising a tube having a conical end, a chill head having a conical bore, said conical end fitting snugly but rotatably into said bore, means for holding said rotatable head on said tube, and means for cooling said tube.

5. A chill comprising a long tube closed at one end, a chill head rotatably mounted on said end, a second tube mounted in the bore of said first mentioned tube, said first mentioned tube having a fluid inlet, and said second tube having a fluid outlet.

6. The combination of a chill and a support therefor, said chill comprising a materially elongated tube with a chill head mounted on one end thereof, said support comprising a fixed bracket, said tube being pivoted to said bracket, and resilient means supporting said tube between said pivoted point thereof and said head.

7. The combination of a chill and a support therefor, said chill comprising a materially elongated tube with a chill head mounted on one end thereof, said support comprising a fixed bracket, said tube being pivoted to said bracket, resilient means supporting said tube between said pivoted point thereof and said head, means for adjusting said resilient means, and means for limiting the elevating effect thereof on said tube.

8. The combination of a chill and a support therefor, said chill comprising a rotatable head which is longitudinally movable with reference to said support.

9. A chill comprising a first elongated tube having a fluid inlet, a second elongated tube mounted within said first tube, and a third tube outside of said first tube but coaxial with said second tube, and a coupling holding in fixed relative positions the adjacent ends of said three tubes.

In testimony whereof, I hereunto set my hand.

JOSEPH W. FAY.